3,521,700
ELECTRIC HEAT CONSERVING AIR CONDITIONING SYSTEM
James A. Knowles, Arcadia, and Brian H. Matosian, North Hollywood, Calif., assignors, by mesne assignments, to James A. Knowles, Arcadia, Calif.
Filed June 28, 1968, Ser. No. 741,034
Int. Cl. F24f 3/00
U.S. Cl. 165—22     3 Claims

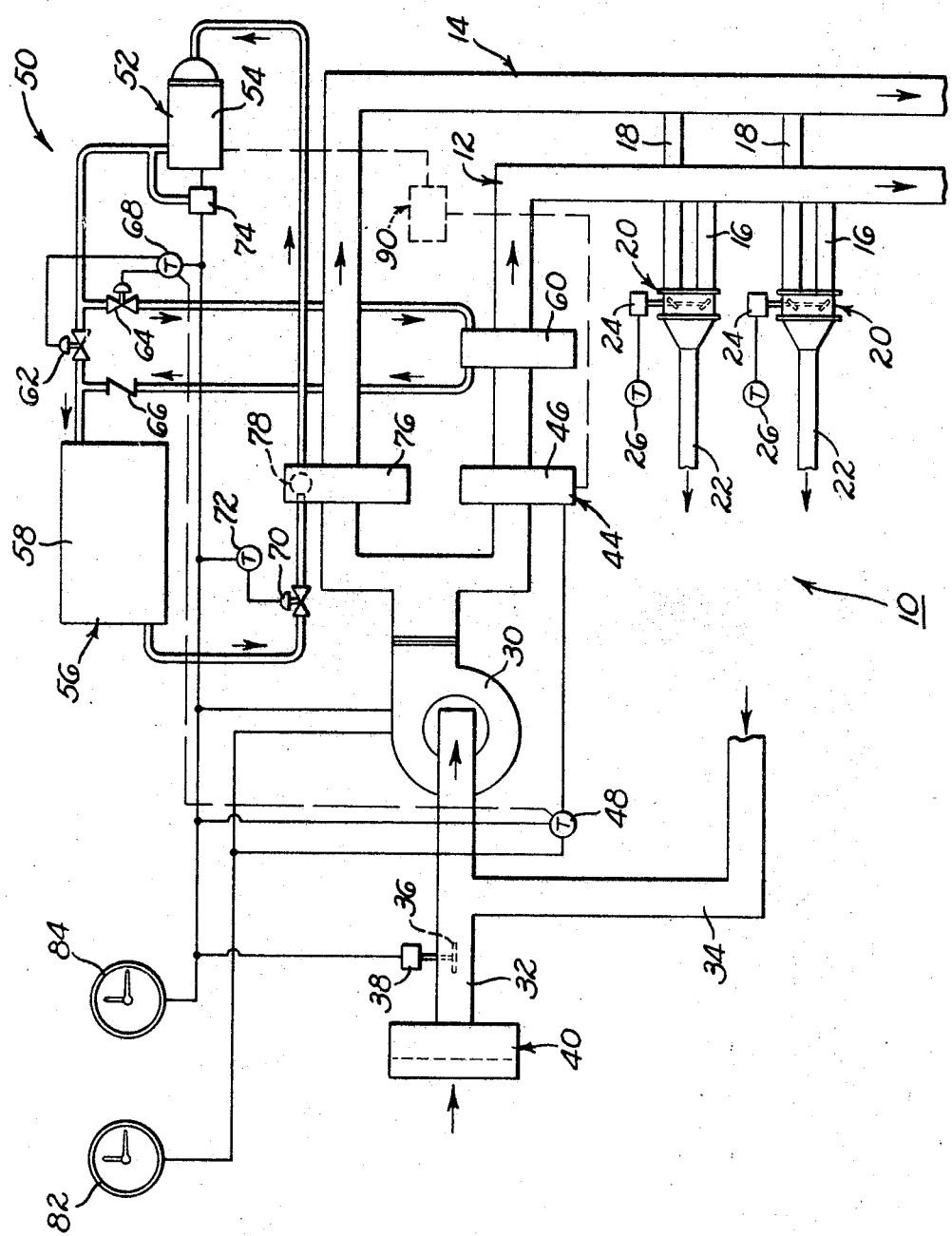
INVENTORS.
JAMES A. KNOWLES
BRIAN H. MATOSIAN
BY THEIR ATTORNEYS.
HARRIS, KIECH, RUSSELL & KERN

United States Patent Office 3,521,700
Patented July 28, 1970

ABSTRACT OF THE DISCLOSURE

An all electric air conditioning system which utilizes an electric heater or heaters to heat air delivered to a building and an electric refrigeration system to cool air delivered thereto. The air conditioning system conserves heat by utilizing a least part of the heat in the refrigerant discharged by the compressor or compressors of the refrigeration system to heat air delivered to the building. The maximum electric power requirements of the compressor or compressors and the maximum electric power requirements of the heater or heaters are substantially equal. A control system limits the combined electric power consumption of the compressor or compressors and the heater or heaters to the foregoing maximum. Thus, the electrical service for the heating and refrigeration systems needs be adequate only to accommodate the maximum electric power demands of one of them.

BACKGROUND OF INVENTION

The invention relates in general to an air conditioning system for the interior of a building, or other space, and, more particularly, to an air conditioning system which includes heating and refrigeration means or systems for simultaneously heating and cooling air delivered to the building as required to meet desired temperatures in various parts of the building.

Mor specifically, the air conditioning system of the invention includes: hot and cold air ducts for delivering hot and cold air to various parts of the building; means for flowing air through the hot and cold air ducts; heating means in the line of the hot air duct for heating air flowing therethrough; electric refrigeration means for cooling air flowing through the cold air duct; means in various parts of the building for mixing hot and hold air from the hot and cold air ducts as required to obtain desired air temperatures; and various controls for the various components for the over-all system.

The refrigeration means or system preferably operates on a conventional closed refrigeration cycle and includes electric refrigerant compressor means, comprising one or more compressors, refrigerant condenser means downstream from the compressor means, refrigerant expansion valve means downstream from the condenser means, and refrigerant evaporator means downstream from the expansion valve means, the expanded refrigerant passing through the evaporator means before returning to the compressor means. The evaporator means is located in the line of the cold air duct to cool air flowing therethrough.

To conserve heat, the condenser means includes a heat exchanger in the line of the hot air duct so as to heat air flowing therethrough, thereby utilizing at least part of the heat in the refrigerant compressed by the compressor means. Means is provided for directing compressed refrigerant from the compressor means to the heat exchanger when it is desired to utilize at least part of the heat in the compressed refrigerant to heat air flowing through the hot air duct. Otherwise, the compressed refrigerant is cooled in a main condenser forming part of the over-all condenser means, the heat exchanger preferably being connected in series with and located upstream from the main condenser when in use.

An important feature of an air conditioning system of the foregoing nature is that it can be operated at minimum expense, due the fact that the refrigeration system removes heat from parts of the building where heat is in excess and delivers it to parts of the building where heat is required. Further, a smaller-capacity heating means or system may be utilized, thereby eliminating any necessity for large, space-consuming heating installation.

Preferably, both the refrigeration system and the heating system are electric so that it is unnecessary to make any provision for gas service, or other hydrocarbon fuel service, to the building. This is important for another reason in that in many areas electric companies offer various economic and promotional benefits to all-electric buildings.

SUMMARY AND OBJECTS OF THE INVENTION

With the foregoing as background, the primary object of the invention is to provide an air conditioning system wherein the maximum electric power requirements or demands of the compressor means of the refrigeration system and the maximum electric power requirements or demands of the heating means are substantially equal, and to provide means controlling the compressor means and the heating means for limiting the combined electric power consumption thereof to the maximum mentioned.

With the foregoing construction, the electric service to the building needs be adequate only to supply the power requirements of the heating system, or the refrigeration system, since both will not operate at maximum capacity at any time. In other words, it is unnecessary to size the electric service to the building to meet the combined maximum power requirements of the heating and refrigeration systems, which is an important feature of the invention.

One object of the invention is to limit the combined electric power consumption of the compressor means and the heating means to the maximum requirements of either by operating only the heating system or the refrigeration system, but not both, at any time.

Another object is to limit the combined electric power consumption of the heating system and the refrigeration system by dividing the electric power supply between the two systems in such a manner that the total does not exceed the maximum requirements of either. For example, the compressor means may compirse two or more compressors and the heating means may comprise two or more electric resistance heaters, or banks of such heaters. With this arrangement, the numbers of compressors and heaters or heater banks in operation are so selected that the total electric load does not exceed the capacity of the electric service.

Thus, by utilizing the referigeration system as a heat source, and by maintaining the combined electric consumption of the heating and refrigeration systems within a predetermined maximum, an extremely efficent and flexible air conditioning system results, which is an important feature of the invention.

The foregoing objects, advantages, features and results of the present invention, together with various other objects, advantages, features and results thereof which will be evident to those skilled in the air conditioning art in the light of this disclosure, may be achieved with the exemplary embodiment of the invention illustrated in the accompanying drawing and described in detail hereinafter.

DESCRIPTION OF DRAWING

The single figure of the drawing is a diagrammatic representation of an air conditioning system which embodies the invention.

DESCRIPTION OF EXEMPLARY EMBODIMENT OF INVENTION

Referring to the drawing, the air conditioning system of the invention is designated generally by the numeral 10 and includes hot and cold air ducts 12 and 14 respectively having branch ducts 16 and 18 connected thereto. Mixing damper assemblies 20 mix hot and cold air in the desired proportions and deliver same to different areas of the building through ducts 22. The mixing damper assemblies 20 are operated by electric damper actuators 24 controlled by thermostats 26 in the areas served thereby.

Air is delivered to and caused to flow through the hot and cold air ducts 12 and 14 by a supply blower or fan 30 which receives air from outside the building and/or air from within the building through outside air and return air ducts 32 and 34, respectively. The proportions of outside air and return air are determined by a damper 36 in the outside air duct 32, this damper being controlled by an electric damper actuator 38. The outside air flowing through the duct 32 passes through a filter 40.

The air flowing through the hot air duct 12 is heated by an electric heating means 44 in the line of the hot air duct. The electric heating means 44 comprises one or more electric resistance heaters or heater banks 46 controlled by a thermostat 48 responsive to the air temperature in the hot air duct 12 and by a thermostat 68 which is responsive to the outside air temperature and which is solar compensated. The control of the heating means 44 by both the thermostats 48 and 68 is indicated by a dotted line connection therebetween.

The air conditioning system 10 includes an electric refrigeration means or system 50 incorporating an electric refrigerant compressor means 52 which may include one or more electrically driven compressors 54. The refrigeration system 50 includes, downstream from the compressor 54, a refrigerant condenser means 56 which includes a main condenser 58 and a heat exchanger 60. Heat removed from the compressed refrigerant by the main condenser 58 is discharged to the exterior of the building, while the heat exchanger 60 is located in the line of the hot air duct 12 so that it serves as a supplementary heating means for the air flowing through the hot air duct.

When the heat exchanger 60 is not in use as a supplementary air heating means, compressed refrigerant from the compressor 54 flows directly to the main condenser 58 through a normally-open solenoid valve 62, being prevented from flowing through the heat exchanger by a normally closed solenoid valve 64. A check valve 66 in series with the heat exchanger 60 prevents reversed flow of compressed refrigerant. The solenoid valves 62 and 64 are controlled by the thermostat 68, which, as indicated previously, responds to the outside air temperature and is solar compensated, and by the thermostat 48 responsive to the air temperature in the hot air duct 12. When the outside air temperature or the hot air duct temperature is above a corresponding predetermined value, the thermostat 48 or the thermostat 68 maintains the solenoid valve 62 open and the solenoid valve 64 closed so that none of the compressed refrigerant passes through the heat exchanger 60. However, when the outside air temperature or the hot air duct temperature is below the corresponding predetermined value, so that use of the heat exchanger 60 as a supplementary heating means is desired, the thermostate 48 or the thermostat 68 opens the solenoid valve 64 and closes the solenoid valve 62. Under these conditions, the compressed refrigerant flows through the heat exchanger 60 and then through the main condenser 58.

Downstream from the main condenser 58 is a solenoid valve 70 controlled by a thermostat 72 which is also responsive to the outside air temperature and solar compensated. When the outside air temperature is below a predetermined value, the thermostat 72 closes the solenoid valve 70 so that a pressure switch 74 responsive to the compressed refrigerant pressure de-energizes the compressor 54 to shut down the refrigeration system 50. When the outside air temperature is above this value, the thermostat 72 opens the solenoid valve 70 so that the reduced pressure on the discharge side of the compressor 54 causes the pressure switch 74 to energize the compressor.

Downstream from the solenoid valve 70 is an evaporator means 76 located in the line of the cold air duct 14 to cool the air flowing therethrough. Just upstream from the evaporator means 76 is an expansion valve or expansion valve means 78 which permits the cooled compressed refrigerant to expand as it enters the evaporator means 76. From the evaporator means, the expanded refrigerant returns to the intake side of the compressor 54.

The refrigeration system 50 operates in a conventional manner. Briefly, the compressed refrigerant discharged by the compressor 54 is cooled by the main condenser 58, or by the heat exchanger 60 and the main condenser 58, in the event that the heat exchanger 60 is used as a supplementary heating means for the air flowing through the hot air duct 12. The cooled compressed refrigerant then passes through the expansion valve or valve means 78 and the expanded refrigerant evaporates in the evaporator or evaporator means 76, thereby cooling the air flowing through the cold air duct 14. The evaporated refrigerant then returns to the compressor 54 for recycling.

In the particular construction illustrated, the entire air conditioning system 10 is controlled by two electric time clocks 82 and 84, the former controlling the system during a period before building occupancy, and the latter controlling the system thereafter. The time clock 82 controls the supply blower 30, and controls the electric heater 46 through the thermostats 48 and 68. The time clock 84 controls the damper actuator 38, the electric heater 46 through the thermostats 48 and 68, the supply blower 30, the solenoid valve 70 through the thermostat 72, the solenoid valves 62 and 64 through the thermostats 48 and 68, and the compressor 54 through the pressure switch 74.

Considering the over-all operation of the air conditioning system 10 as thus far described, at a predetermined time prior to occupancy of the building, the time clock 82 energizes the supply blower 30 and permits energization of the electric heater 46 by the thermostats 48 and 68, the damper 36 being closed at this time so that the air within the building is recirculated, and no outside air is admitted. During this interval, the refrigeration system 50 is de-energized. Thus, under such conditions, the building is warmed up, under the control of the thermostats 48 and 68, as required prior to morning occupancy, the heat provided by the electric heater 46 being supplemented by heat from the lighting system within the building, any solar heating, and the like.

Shortly before the time the building is to be occupied in the morning, the time clock 84 takes over and opens the damper 36 to admit fresh air from the exterior of the building, which is mixed with the return air. Also, the time clock 84 energizes the refrigeration system, which operates under the control of the thermostats 68 and 72. As previously explained, the thermostat 48 or 68 diverts the compressed refrigerant to the heat exchanger 60 to provide supplementary heating of the air flowing through the hot air duct 12, if temperature conditions warrant such supplementary heating. In doing this, the refrigeration system 50 takes heat from areas of the building where excess heat is available and distributes it to areas where the temperatures may be below desired values. This results in extremely efficient operation of the over-all air conditioning system 10.

Turning now to a consideration of the primary feature of the invention, the maximum electric power demand or requirement of the electric heater 46 is substantially equal to that of the compressor 54, and the air conditioning system 10 includes control means 90, interconnecting the electric heater 46 and the compressor 54, for preventing operation of both of these units simultaneously. Consequently, the electrical service provided to the air conditioning system 10 needs be adequate only to supply the maximum power requirement of either the electric heater 46, or the compressor 54, but not both. This is important because it minimizes the capacity of the electrical service required for the air conditioning system 10. The control means 90 may be simply an electric relay interlock which prevents energization of the electric heater 46 when the compressor 54 is energized, even though the thermostat 48 or 68 demands energization of the electric heater.

In the particular embodiment shown, wherein the air conditioning system 10 includes one electric heater or heater bank 46 and one compressor 54, the control means 90 simply precludes simultaneously operation of both. However, the electric heating means 44 may comprise more than one electric heater or heater bank 46, and the compressor means 52 may comprise more than one compressor 54, each set having a total maximum electric power requirement substantially equal to that of the other set. In such a case, the control means 90 may split the available electric power between the electric heating means 44 and the compressor means 52, while limiting the combined electric power consumption of the heating means 54 and the compressor means 52 to the maximum of which each is capable. For example, if there are two electric heaters 46 and two compressors 54 all having substantially equal maximum electric power requirements, the control means 90 may permit operation of one electric heater and one compressor, in the event that conditions in the building are such that some areas require heating and others require cooling. Various other modes of operation of this general character are also possible with other numbers of electric heaters and compressors.

Although an exemplary embodiment of the invention has been disclosed herein for purposes of illustration, it will be understood that various changes, modifications and substitutions may be incorporated in such embodiment with departing from the spirit of the invention as defined by the claims appearing hereinafter.

We claim as our invention:

1. In an air conditioning system for a building, or the like, the combination of:
    (a) hot and cold air ducts for delivering hot and cold air to the building;
    (b) means for flowing air through said hot and cold air ducts;
    (c) electric heating means in the line of said hot air duct for heating air flowing through said hot air duct;
    (d) electric refrigeration means including electric refrigerant compressor means, refrigerant condenser means downstream from said compressor means, refrigerant expansion valve means downstream from said condenser means, and refrigerant evaporator means downstream from said expansion valve means and through which the expanded refrigerant passes before returning to said compressor means;
    (e) said evaporator means being located in the line of said cold air duct to cool air flowing therethrough;
    (f) said condenser means including a main condenser and including a heat exchanger in the line of said hot air duct so as to heat air flowing therethrough;
    (g) means for directing compressed refrigerant from said compressor means to said heat exchanger when it is desired to utilize said heat exchanger to heat air flowing through said hot air duct;
    (h) the maximum electric power requirements of said compressor means and the maximum electric power requirements of said electric heating means being substantially equal; and
    (i) control means controlling said compressor means and said electric heating means for limiting the combined electric power consumption thereof to said maximum.

2. An air conditioning system as defined in claim 1 wherein:
    (a) said compressor means includes at least one compressor;
    (b) said electric heating means includes at least one electric resistance heater;
    (c) the maximum electric power requirements of said compressor and said heater are substantially equal; and
    (d) said control means comprises means for preventing simultaneous energization of said compressor and said heater.

3. In an air conditioning system for a building, or the like, the combination of:
    (a) electric heating means for heating air delivered to the building;
    (b) electric refrigeration means for cooling air delivered to the building and including electric refrigerant compressor means;
    (c) means for utilizing at least part of the heat in the refrigerant compressed by said compressor means to heat air delivered to the building;
    (d) the maximum electric power requirements of said compressor means and the maximum electric power requirements of said electric heating means being substantially equal; and
    (e) control means controlling said compressor means and said electric heating means for limiting the combined electric power consumption thereof to said maximum.

References Cited

UNITED STATES PATENTS

| 2,755,072 | 7/1956 | Kreuttner | 165—22 |
| 3,283,809 | 11/1966 | Eberhart | 165—29 |

ROBERT A. O'LEARY, Primary Examiner

C. SUKALO, Assistant Examiner

U.S. Cl. X.R.
165—26, 29